R. A. FESSENDEN.
LOCATING ENEMY GUN POSITIONS.
APPLICATION FILED APR. 19, 1918.

1,341,795.                                    Patented June 1, 1920.

WITNESS:                                      INVENTOR.

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

LOCATING ENEMY-GUN POSITIONS.

1,341,795.   Specification of Letters Patent.   Patented June 1, 1920.

Application filed April 19, 1918. Serial No. 229,634.

*To all whom it may concern:*

Be it known that I, REGINALD A. FESSENDEN, of Brookline, in the county of Norfolk and State of Massachusetts, a citizen of the United States, have invented new and useful Improvements in Locating Enemy-Gun Positions, of which the following is the specification.

My invention relates to the location of enemy gun positions and has for its object increased efficiency in locating such positions.

Figure 1:
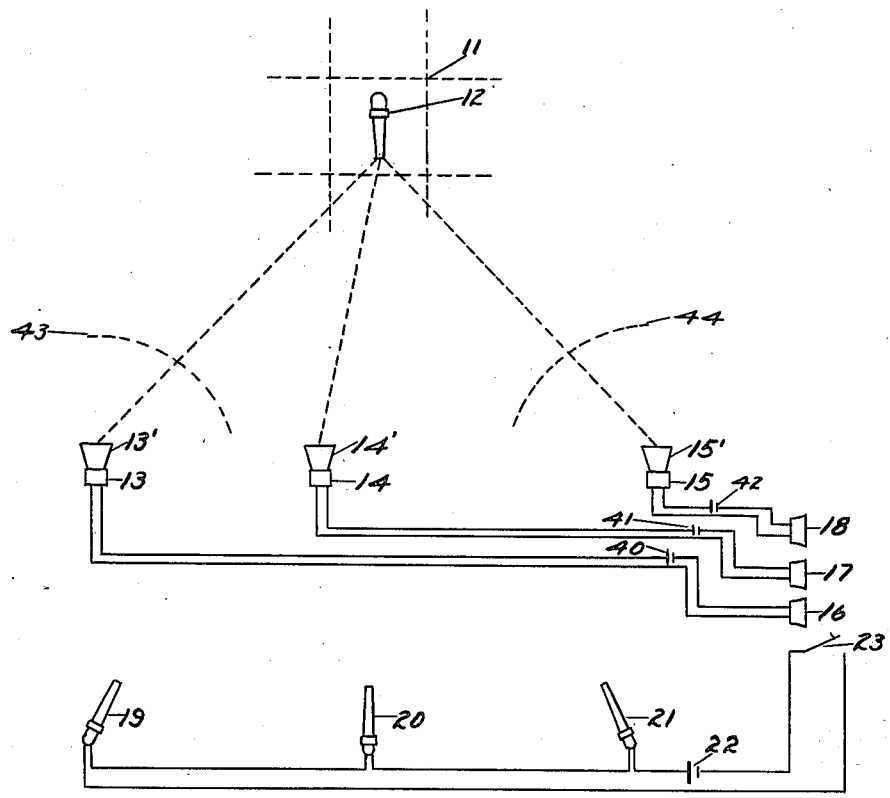
Figure 2:
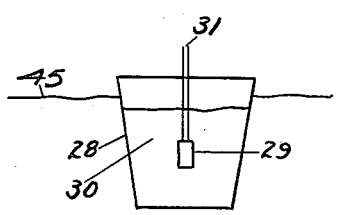
Figure 3:
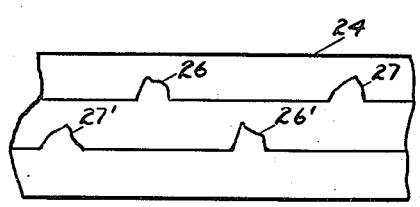

In the drawings accompanying this specification, Figures 1 and 2 show, partly diagrammatically, means for accomplishing these results, and Fig 3 shows a portion of one of the records which may be utilized for obtaining the results desired.

As is well known in warfare, the territory in the neighborhood of the fighting line is divided into squares of any suitable area; for example, in artillery work, the squares may be twenty-five yards on the side.

Such a square, 11, in which an enemy's gun 12 is located is shown in Fig. 1. 13, 14, 15 are microphones placed back of our own line, and any suitable distance—for example, one-half mile or a mile—apart, the microphones being provided with megaphone funnels 13', 14', 15' so as to enable them better to receive the sound of the gun 12 when fired, and also to enable them to shut off to a certain extent the sound of guns fired from the rear or from one side.

These microphones are connected to the receivers 16, 17, 18 by circuits containing batteries 40, 41, 42, as shown.

The receivers 16, 17, 18 are preferably located in a sound proof receiver's booth and the observer is provided with a chronograph, or other suitable time measuring apparatus.

The observer first listens in on telephones 16 and 17 and, in the case shown, will hear the sound of the gun 12 when fired on the receiver 17 before he hears it on the receiver 16.

Immediately on hearing the sound of the gun in the receiver 17, the observer depresses the chronograph key and later, on hearing it in the receiver 16, presses the key a second time. From the measured difference in the indications on the chronograph he is able to tell the difference in the times taken by the sound of the gun to arrive at the microphones 13 and 14 and, knowing the velocity of sound in air, to determine how much farther away the gun is from 13 than from 14. Let the difference in distance so called be "A". Taking a map the observer then describes a circle 43, having its center at the location of the microphone 13 and its radius equal to A.

Similarly, by listening in on the receivers 17 and 18, the observer determines the difference in the distance from the microphone 14 to the gun and from the microphone 15 to the gun, which distance we will call "B". The observer then draws a similar circle 44 on the map with its center at the location of the microphone 15 and having its radius equal to B. The gun 12 will obviously be at the center of the circle whose circumference touches the circle 43, the circle 44, and the location of the microphone 14, which is easily determined by ordinary geometric means.

If desired, the observer may listen in on the microphones 16 and 18, and in this way obtain a check on the location of the gun 12 determined by listening in on the receivers 16 and 17 and then on the receivers 17 and 18.

In place of using microphones responsive to waves transmitted through the air, as shown above, the microphones may be so arranged as to be responsive to the shock produced by the discharge of the gun and transmitted through the ground.

Suitable means for doing this are shown in Fig. 2, where 45 is the surface of the ground; 28 is a pail immersed in the ground, containing a suitable fluid 30—for example, water. The microphone 29 is immersed in the liquid, and 31 are the conductors leading from the microphone. This arrangement is very sensitive to tremors or shocks transmitted through the ground.

If desired, some of the microphones may be used for receiving the sound of discharge transmitted through the air and some may be used for receiving the discharge shock transmitted through the ground, the distance being found from the different velocities with which sounds travel through air and through ground.

In place of using a chronograph of the ordinary type a recording filament galvanometer of the type invented by the writer and described by him at the American Association for the Advancement of Science in 1892 and commonly known as the Einthoven galvanometer may be used. The Einthoven galvanometer is well known to those skilled in the art. Two forms of this instrument are illustrated and described in applicant's U. S. Patents No. 979,145, issued Dec. 20, 1910, filed Dec. 23, 1907, and No. 1,045,782, issued Nov. 26, 1912, filed Jan. 29, 1910. In Fig. 2 of the latter patent is shown a type in which the record is made on a moving strip of photographic film.

In this case two filaments are preferably used, being connected severally first to the microphones 13 and 14 and then to the microphones 14 and 15. Fig. 3 shows a record such as has been obtained from the two microphones 13 and 14. In this figure 24 is a strip of the photographic recording filament and 26 represents the record obtained from one filament and microphone from the discharge of the gun 12, and 26' the record obtained from the other filament and microphone.

Knowing the speed of the photographic strip, the length of time elapsing between the times of production of the two records is easily measured.

This method is advantageously used where there are a number of enemy guns in action firing approximately simultaneously, as the records made by the different guns may be identified; for example 27, 27' being different in shape from 26, 26' may be identified as the record of some other gun, and the location of this other gun may also be similarly obtained. This is possible because by this method, as distinguished from the microphone method or the chronograph method, the curves showing the variation of sound with time for each individual gun are accurately reproduced, and since the shape of these curves is in general different for each individual gun, each gun may be identified, which is not possible with the microphone or ordinary chronograph method, and only possible, so far as applicant knows, by this method. The official reports on these various types of applicant's apparatus are to the effect that the microphone and chronograph are only useful where the number of guns firing is very limited, but that the wire galvanometer, or as applicant terms it, the pallograph method is satisfactory even in cases of very heavy, almost continuous firing.

In place of using two filaments connected to two microphones, three filaments may be used in the galvanometer and these may be connected to the three microphones so that the records from the gun 12 may all be produced on the same piece of photographic record strip, as described in applicant's memorandum to the British War Office and U. S. Ordnance Board, No. 1, September 12, 1914.

This method may also be applied to locating similar bodies; for example, Zeppelins and aeroplanes, as stated in U. S. application 35,957, June 23, 1915, of which the present application is a continuation as to all matter common to both applications.

By the term "enemy gun position" is meant any position from which projectiles are discharged by the enemy.

What I claim is:

1. Means for determining the location of enemy gun positions comprising a plurality of electro sound receiving mechanisms located at a distance from each other and from the enemy gun position which is to be located; a photographically recording string oscillograph provided with a plurality of strings, said strings being operatively connected to said electro receiving mechanisms, and means for moving the photographic record of said photographically recording oscillograph at a predetermined rate whereby the intensities and times of arrival of the sounds produced by a number of guns fired approximately simultaneously are recorded and the sound produced by the individual guns may be identified.

2. Means for determining the location of enemy gun positions comprising a plurality of electric sound-receiving mechanisms located at a distance from each other and from the enemy gun positions which are to be located, a string oscillograph provided with a plurality of strings, said strings being operatively connected to said electric receiving mechanisms and means for observing the movements of said strings produced by said electric sound-receiving mechanisms on the arrival of the sounds of the discharges of said enemy guns.

REGINALD A. FESSENDEN.